United States Patent
Cale

[11] 3,863,525
[45] Feb. 4, 1975

[54] METHOD OF MAKING A FORGING DIE
[75] Inventor: Roland E. Cale, Mt. Lebanon Township, Pa.
[73] Assignee: Schaefer Equipment Company, Pittsburgh, Pa.
[22] Filed: Apr. 24, 1974
[21] Appl. No.: 463,741

[52] U.S. Cl. .............................. 76/107 R, 90/11 C
[51] Int. Cl. .............................................. B21k 5/20
[58] Field of Search....... 76/107 R; 90/11 C; 72/470

[56] References Cited
UNITED STATES PATENTS
| | | | |
|---|---|---|---|
| 435,855 | 9/1890 | O'Leary | 76/107 R |
| 1,430,385 | 9/1922 | Komarek | 76/107 R |
| 2,737,067 | 3/1956 | White | 76/107 R |

*Primary Examiner*—Leonidas Vlachos
*Attorney, Agent, or Firm*—Brown, Murray, Flick & Peckham

[57] ABSTRACT

A first rotating end-type milling cutter has a hemispherical lower end and is moved down into a metal block to form a hemispherical recess in it. The block then is moved across the cutter to cause it to cut a horizontal groove in the block having horizontally curved end walls, after which the cutter is removed and a second milling cutter is positioned with its lower end in one side of the groove near one end thereof. The lower end of the second cutter is hemispherical but smaller than the first cutter. The second cutter is rotated while maintaining it substantially in contact with the wall of the groove and simultaneously moving it downwardly in the groove and across it and up to its opposite side. This movement is constantly repeated as the block is moved lengthwise of the groove to move one end of it toward the cutter so that the cutter will cut into the curved end wall and form an arcuate shoulder. Another die block is formed in the same way so that when the two blocks are placed together with their grooves registering, a cylindrical die cavity will be formed having an end wall shaped like part of a sphere and spaced inwardly from the side wall of the cavity by an annular shoulder. A rodlike member forged between these die blocks will have at one end a projection shaped like part of a sphere and spaced inwardly from the periphery of that member.

3 Claims, 9 Drawing Figures

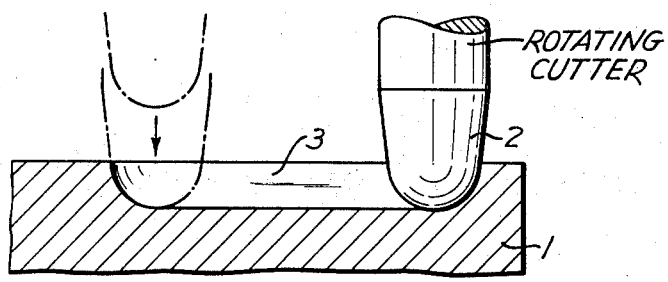
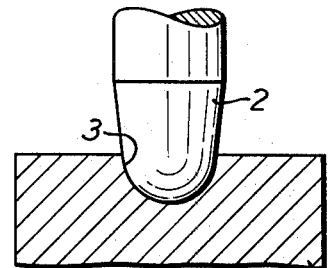
Fig.1
Fig.3
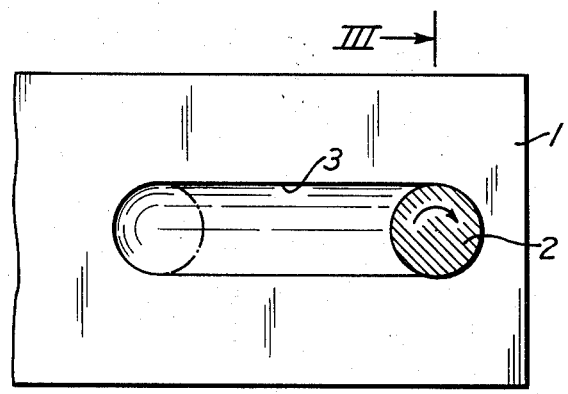
Fig.2
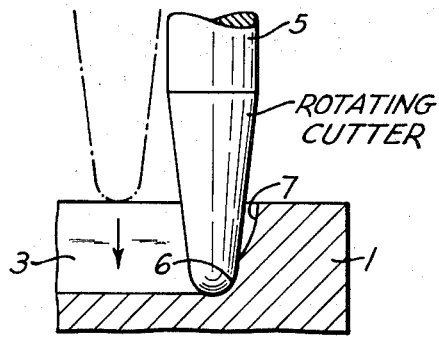
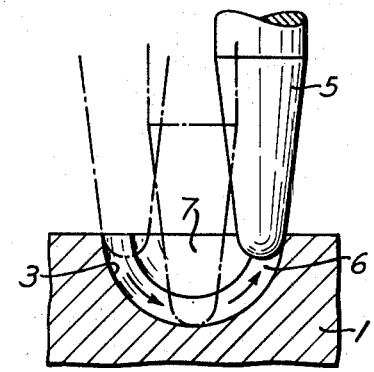
Fig.4
Fig.6
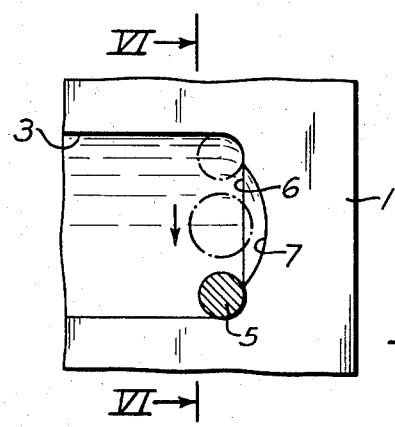
Fig.5

METHOD OF MAKING A FORGING DIE

To butt weld two rods or rod-like members end-to-end by electric current passing through them and forming an arc between their ends, the rods are held in clamps while their spaced ends are being heated by the arc until nearly molten and then they are forced together. This operation is not very successful if the ends of the rods are flat and parallel, because the heating is not concentrated enough. It has therefore been proposed that the end of one of the rods be tapered, but that has not been satisfactory either because the heating concentrates at the apex of the cone first and does not spread out enough. To remedy this, it is desirable to provide the end of one of the rods with a convex portion or bulge so that the heat can be concentrated in an area equal to about one-third of the cross section of the rod. However, the maximum projection or depth of the bulge should not be greater than about one-sixth the diameter of the rod nor less than one-tenth of that diameter, and preferably about one-eighth of it. It has been found that such a rod can readily be electrically welded to the end of another rod.

One place that such welding is very useful is in the welding of railroad brake rigging, where Y-shape jaws are attached to the ends of a rod to connect them. Although a good shape for the end of one of the abutting members has been determined as just explained, the problem remains as to how forging dies can be produced economically to forge such a shape.

It is therefore among the objects of this invention to provide a method of making forging dies of a shape that will produce the desired bulge on the ends of rod-like members, which can be carried out quickly and easily with a minimum of tools.

The preferred embodiment of the invention is illustrated in the accompanying drawings, in which FIG. 1 is a longitudinal section through a die block in which a groove has been cut;

FIG. 2 is a plan view with the cutting tool shown in section;

FIG. 3 is a cross section taken on the line III—III of FIG. 2;

FIG. 4 is an enlarged fragmentary longitudinal section showing the use of a second cutting tool;

FIG. 5 is a plan view, with the second cutter shown in section;

FIG. 6 is a cross section taken on the line VI—VI of FIG. 5;

Figure 7:
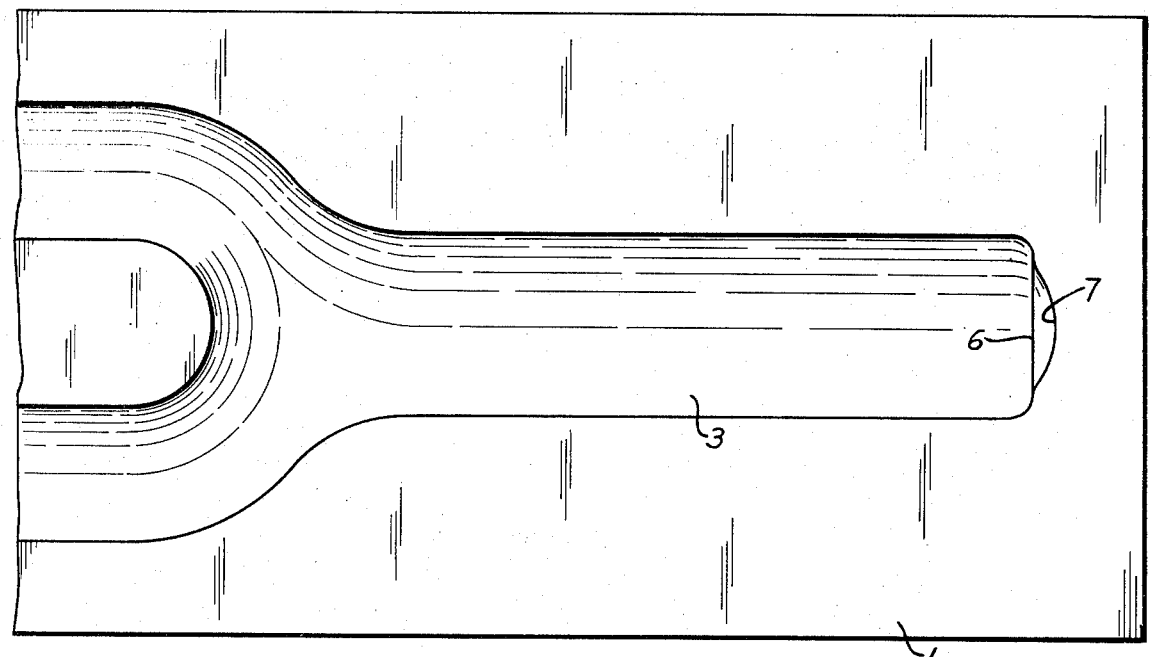
FIG. 7 is a further enlarged fragmentary plan view of a finished die block.

Referring to FIGS. 1 to 3 of the drawings, a metal block 1 is shown that will form the lower half of a forging die. The block is clamped in an orbital die-sinking machine of well-known construction, which can feed the block lengthwise after a downwardly tapered end-type milling cutter 2 has cut a recess in the block. As is customary with such cutters, the tapered portion is tapered at about a 7° angle with its axis. The milling cutter has a hemispherical lower end, the maximum diameter of which (the diameter at the top of the hemisphere) is the same as the diameter of the die cavity that is to be formed. The cutting edges on the cutter are not shown but they are well known. The rotating cutter is lowered from its upper dotted line position in FIG. 1 into engagement with the top of the block and then is pressed down against the block until it reaches its lower dotted line position, resulting in the formation of a hemispherical recess. Then, while the rotating cutter is maintained in that position, the block is mored lengthwise across the cutter so that a horizontal groove 3 is cut in the block. The movement of the block is stopped before the end of it reaches the cutter, which is then lifted from the block, leaving a groove in it that is semi-cylindrical (FIG. 3) with curved end walls as shown in FIG. 2.

The next operation is to move the block back a short distance in the opposite direction and to replace the cutter with a second downwardly tapered end-type milling cutter 5 likewise having a hemispherical lower end as shown in FIG. 4. The taper of the cutter is about 7°. However, this is a smaller cutter and the maximum diameter of its hemispherical end should not exceed about ⅛ of the maximum diameter of the hemispherical lower end of the first cutter. The second cutter is lowered from its dotted line position in FIG. 4 until the side of its lower end engages or substantially engages the side wall of the groove near one upper edge. The orbital die-sinking machine is set in motion to rotate the cutter and to simultaneously move it downwardly along the wall of the groove and across the groove and up its opposite side as indicated in FIG. 6. The machine can be set either to move the cutter in the same direction continuously in a complete vertical orbit, or to move the cutter back and forth in an arcuate path along the wall of the groove from one edge to the other. In either case, while the cutter is moving across the groove the die block is moved lengthwise to slowly move the adjacent end of the groove toward the cutter. Consequently, as the wall of the narrowing end of the grooves engages the cutter, the latter starts to remove metal to make the size and shape of that part of the groove the same as the main part as shown in FIG. 5. The result is that an arcuate, more or less radial, shoulder 6 is formed in the groove near one end. The horizontally curved end wall 7 of the groove then begins at this shoulder and has a smaller surface area than originally.

The second cutting tool 5 then is removed from the block, and the opposite end of the block then can be provided in any suitable manner with whatever die cavity is necessary to complete the bottom half of the die. For example, the cavity shown in FIG. 7 is Y-shape because a fork-shape member is to be forged in it.

Figure 8:
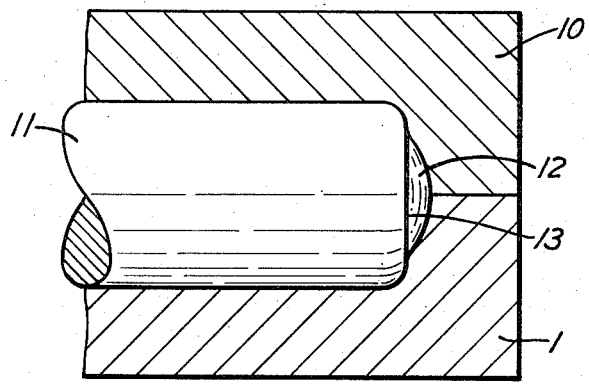
FIG. 8 is a fragmentary longitudinal section of two die blocks in closed position around a rod member.

After this die block has been formed, a second block 10 is formed in the same way so that when the two are placed together with their grooves registering, as shown in FIG. 8, a cylindrical die cavity is formed that has an end wall shaped like part of a sphere. The circular edge of this end wall merges into an annular shoulder that is formed by the two arcuate shoulders 6 that are brought together when the two blocks are superimposed. The edge of the concavity in the end of the die cavity will therefore be spaced inwardly from the cylindrical side wall of the die cavity. The annular shoulder is located in such a position that its inner edge lies in a substantially vertcal plane that is spaced from the adjacent extreme end point of the die cavity a distance that is preferably equal to about ⅛ of the diameter of the main part of the die cavity, although this distance could be anywhere from 1/6 to 1/10 of that diameter, but that would not be as good as ⅛.

Figure 9:
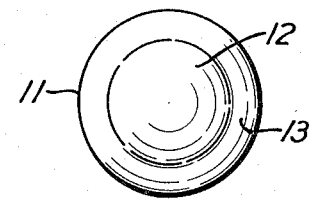
FIG. 9 is an end view of the forged rod member.

When a piece is forged in this die the rod-like member 11 that is formed will have at one end a bulge or projection 12 shaped like part of a sphere and spaced inwardly from the periphery of the rod by means of a shoulder 13 as shown in FIGS. 8 and 9. This forging is very suitable for electric welding to the end of a a rod. Making of the straight cylindrical die cavity with the desired partial sphere at one end is simplified by the method disclosed herein, since it requires only two cutters and can be done in a conventional orbital die-sinking machine.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In the method of making a forging die for forming on one end of a cylindrical rod-like member a projection shaped like part of a sphere spaced inwardly from the periphery of said member, the steps comprising moving a first rotating end-type milling cutter having a hemispherical lower-end down into a metal block to form a hemispherical recess therein, then moving the block at right angles to the cutter axis to cause the cutter to cut in the block a horizontal groove of predetermined length having horizontally curved end walls, removing the cutter from the block, positioning the lower end of a second downwardly tapered end-type milling cutter in one side of the groove near one end thereof, the lower end of the second cutter being hemispherical with a maximum diameter not exceeding about one-third of the maxiimum diameter of the hemispherical lower end of the first cutter, rotating the second cutter while maintaining it substantially in contact with the wall of the groove and simultaneously moving it downwardly in the groove and across it and up its opposite side, constantly repeating said movement of the second cutter across the groove as said block is moved lengthwise of the groove to slowly move said one end of the groove toward the second cutter to cause the cutter to cut into the curved end wall and form an arcuate shoulder, and forming another die block in the same way so that when the two blocks are placed together with their grooves registering a cylindrical die cavity will be formed having an end wall shaped like part of a shpere and spaced inwardly from the cylindrical side wall of said cavity by an annular shoulder formed from both arcuate shoulders.

2. In the method recited in claim 1, locating the inner edge of said shoulder in a substantially vertical plane spaced from the center of the top of the adjoining curved end wall a distance equal to between one-sixth and one-tenth of the width of the top of said groove.

3. In the method recited in claim 1, locating the inner edge of said shoulder in a substantially vertical plane spaced from the center of the top of the adjoining curved end wall a distance equal to about one-eighth of the width of the top of said groove.

* * * * *